Patented Sept. 28, 1943

2,330,747

UNITED STATES PATENT OFFICE 2,330,747

PROCESS OF MANUFACTURING BUILDING BLOCKS

Joseph C. Roediger, Brooklyn, N. Y., assignor, by mesne assignments, to Standard Catalytic Company, a corporation of Delaware No Drawing. Application October 28, 1939, Serial No. 301,777

1 Claim. (Cl. 106—279)

This invention relates to improvements in the methods of treating soils for the manufacture of blocks for use in curtain or bearing wall construction, or as flooring blocks. These improvements may also be applied to the monolithic laying of soil-asphalt mixtures for low cost roadways, now termed "soil stabilization."

It is well known that dwellings may be made of earth or clay earth which is perhaps the material used in the first buildings erected by man, but the objections to structures of such material were that they often washed away during long, rainy seasons, were susceptible to infestation by rodents, vermin and the like, and in many cases developed cracks due to stresses set up by climatic changes. Bricks were later used which were prepared by mixing clay and straw and allowing the moulded mixture to harden by exposure to the sun. In the development of brick manufacturing methods, artificial heat was used in order to obtain a stronger material which would resist the effects of water and thereby be an improvement over the ordinary clay-straw brick.

Building blocks have been manufactured in recent years from a mixture of soil, selected or adjusted to have a satisfactory grading and a suitable content of clay, with the proper amount of cutback asphalt or emulsified asphalt. This mixture which generally contains water to facilitate the thorough incorporation of the asphaltic material is compacted into blocks of the desired size using known methods of compaction. The finished block is then cured by natural or artificial means so that it may obtain a suitable strength before use in construction.

It is an object of this invention to manufacture building blocks using as the major proportion of the material clay or soil which is available at the location where the building is to be erected and thereby economizing by using the cheapest material available in that locality.

According to this invention, soil is treated with a suitable amount of a fluid to permit the satisfactory incorporation of powdered hard asphalt. The amount of fluid used for tempering the soil may be from 1 to 15% depending upon the characteristics of the soil, whereas the required amount of powdered asphalt may vary in the same manner from a value of 3% up to 15%, depending upon the amount found necessary to render the soil substantially waterproof and stable to the effects of water. The fluid used in preparing this slurry may be water or any other fluid or an emulsion in which is incorporated the powdered hard asphalt. A uniform distribution of the powdered asphalt throughout the mass of soil is thereby obtained. To this plastic mixture of soil, fluid and powdered hard asphalt is added a suitable fluxing material, such as a flux oil or an asphalt of low consistency, or a mixture of flux oil and asphalt of low consistency. This mixture of soil, water, powdered asphalt and flux oil, or asphalt of low consistency, is then placed in a mould and formed into blocks. The blocks may be cured by allowing to stand with or without heating or by subjecting to pressures up to 3000 or more pounds per square inch or to the action of a pneumatic tamping device. If desired, the powdered hard asphalt may be incorporated in the soil while in the dry state, that is, no fluid may be used in mixing the two, although it is preferred to use a fluid to get a better dispersion of the soil. It is only after a uniform mixture of the soil and powdered asphalt is obtained that the flux oil or other fluxing material is to be added.

Wetting agents may also be used. They may be incorporated into the soil before the addition of the asphalt or together with the powdered hard asphalt or in the flux oil that is being used.

I claim:

A process of manufacturing building blocks, curtain wall blocks and floor blocks, which comprises mixing in a cold state soil and 1% to 15% of water based on the weight of the soil to form a plastic mass, adding to the mixture of soil and water 3% to 15% of powdered hard asphalt based on the weight of the soil, adding to said mixture asphalt of low consistency to flux the mixture of soil and asphalt, and shaping into blocks.

JOSEPH C. ROEDIGER.